United States Patent
Liu et al.

(10) Patent No.: US 11,143,824 B2
(45) Date of Patent: Oct. 12, 2021

(54) CONNECTOR ASSEMBLY, PLUG CONNECTOR AND CORE UNIT THEREOF

(71) Applicant: AVIC JONHON OPTRONIC TECHNOLOGY CO., LTD, Henan (CN)

(72) Inventors: Naichang Liu, Henan (CN); Kai Hu, Henan (CN); Xutao Wang, Henan (CN); Yunzhao Han, Henan (CN); Wenhao Yao, Henan (CN); Jinke Shen, Henan (CN); Weike Li, Henan (CN); Xueshun Wu, Henan (CN); Geng Xu, Henan (CN)

(73) Assignee: AVIC JONHON OPTRONIC TECHNOLOGY CO., LTD, Henan (CN)

( * ) Notice: Subject to any disclaimer, the term of this patent is extended or adjusted under 35 U.S.C. 154(b) by 0 days.

(21) Appl. No.: 16/642,379

(22) PCT Filed: Aug. 31, 2018

(86) PCT No.: PCT/CN2018/103449
§ 371 (c)(1),
(2) Date: Feb. 27, 2020

(87) PCT Pub. No.: WO2019/042392
PCT Pub. Date: Mar. 7, 2019

(65) Prior Publication Data
US 2020/0200983 A1 Jun. 25, 2020

(30) Foreign Application Priority Data

Aug. 31, 2017 (CN) .......................... 201710772202.1

(51) Int. Cl.
*G02B 6/36* (2006.01)
*G02B 6/38* (2006.01)

(52) U.S. Cl.
CPC ......... *G02B 6/3897* (2013.01); *G02B 6/3895* (2013.01)

(58) Field of Classification Search
CPC .. G02B 6/3897; G02B 6/3895; G02B 6/3887; G02B 6/3879; G02B 6/36
See application file for complete search history.

(56) References Cited

U.S. PATENT DOCUMENTS 6,464,402 B1 * 10/2002 Andrews ................ G02B 6/381
385/134
2012/0070120 A1 3/2012 Hoffmann et al.
(Continued)

FOREIGN PATENT DOCUMENTS

CN 201514499 6/2010
CN 101907750 12/2010
(Continued)

OTHER PUBLICATIONS

"Search Report of China Counterpart Application", dated Jul. 27, 2020, pp. 1-3.
(Continued)

*Primary Examiner* — Jennifer Doan
(74) *Attorney, Agent, or Firm* — JCIPRNET

(57) ABSTRACT

The present invention relates to a connector assembly and a plug connector and a core unit thereof. The core unit, with its front end being an inserted end, includes a front casing and a rear casing oriented and assembled in front and rear directions. The rear casing is provided with a guide mounting structure for disposing an optical cable inside the rear casing. The front casing is provided with a plug body at a front end thereof. A limiting structure is arranged between the front casing and the rear casing to limit the positions to which the front and rear casings are separated in the front and rear directions, ensuring that after the plug body is
(Continued)

plugged in place, a protective casing and a receptacle casing are locked and fit to each other continuously.

9 Claims, 2 Drawing Sheets

(56) References Cited

U.S. PATENT DOCUMENTS

| | | | |
|---|---|---|---|
| 2016/0004016 A1 | | 1/2016 | Zimmel et al. |
| 2016/0231512 A1* | | 8/2016 | Seki .................. G02B 6/387 |
| 2017/0017046 A1 | | 1/2017 | Sato et al. |
| 2018/0120517 A1* | | 5/2018 | Li ..................... G02B 6/3893 |

FOREIGN PATENT DOCUMENTS

| | | |
|---|---|---|
| CN | 102207590 | 10/2011 |
| CN | 102385120 | 3/2012 |
| CN | 102870023 | 1/2013 |
| CN | 203825235 | 9/2014 |
| CN | 104317007 | 1/2015 |
| CN | 204331094 | 5/2015 |
| CN | 105044853 | 11/2015 |
| CN | 204882958 | 12/2015 |
| CN | 105223659 | 1/2016 |
| CN | 105372765 | 3/2016 |
| CN | 205104714 | 3/2016 |
| CN | 105467528 | 4/2016 |
| CN | 106646776 | 5/2017 |
| CN | 106842437 | 6/2017 |
| JP | 2013109351 | 6/2013 |
| JP | 2013521520 | 6/2013 |
| WO | 2016074938 | 5/2016 |

OTHER PUBLICATIONS

"Search Report of Europe Counterpart Application", dated Aug. 4, 2020, pp. 1-7.

"International Search Report (Form PCT/ISA/210) of PCT/CN2018/103449", dated Nov. 23, 2018, with English translation thereof, pp. 1-4.

Office Action of China Counterpart Application, dated Mar. 19, 2021, pp. 1-11.

Office Action of Japan Counterpart Application, dated Apr. 6, 2021, pp. 1-3.

* cited by examiner

CONNECTOR ASSEMBLY, PLUG CONNECTOR AND CORE UNIT THEREOF

CROSS-REFERENCE TO RELATED APPLICATION

This application is a 371 of international application of PCT application Ser. No. PCT/CN2018/103,449, filed on Aug. 31, 2018, which claims the priority benefit of China application no. 201710772202.1, filed on Aug. 31, 2017. The entirety of each of the above mentioned patent applications is hereby incorporated by reference herein and made a part of this specification.

BACKGROUND

Technical Field

The invention relates to a connector assembly, a plug connector and a core unit thereof.

Description of Related Art

In the related art, a plug connector includes a core unit, and the core unit includes a plug casing. A plug body is disposed inside the plug casing. An optical fiber is passed through a rear side of the plug body, and the optical fiber is connected to a contact member of the plug body inside the plug connector. In order to ensure that the contact member inside the plug connector is stably connected to a corresponding receptacle connector, the contact member is floatingly installed inside the plug body most of the time. To be specific, a spring configured to apply a forward force to the contact member is disposed inside the plug body. As such, when the plug is inserted into the receptacle, as the contact member is floatingly installed, compliance with assembly tolerances of the receptacle holes and the plug pins is achieved.

Nevertheless, in the related art, after the plug connector is inserted into the receptacle connector, the plug connector generally has to be locked onto the receptacle connector. A thread is provided on the casing of the receptacle connector, a protective casing is disposed outside and shielding the core unit. The plug body is ensured to be fixed inside the plug connector by mating the protective casing with the thread of the receptacle casing.

Nevertheless, thread sizes on different positions of the receptacle connector may present certain deviations in the front and rear directions. That is, when the plug connector is fixed onto the receptacle connector, the plug body is plugged in place in the receptacle connector. But since the thread sizes are different, the plug casing and the protective casing on the plug connector are not firmly locked. As such, a strong squeezing force may be generated between the plug body and the receptacle connector if the protective casing is continuously screwed forward, and the plug body may be damaged as affected by such strong squeezing force.

SUMMARY

The invention aims to provide a connector assembly that is capable of preventing a plug body from being forcibly pressed and damaged, the invention aims to further provide a plug connector of the connector assembly, and the invention aims to further provide a core unit of the plug connector.

To accomplish the foregoing aims, the following technical features are adopted for the core unit of the invention.

A core unit, with its front end being an inserted end, includes a front casing and a rear casing oriented and assembled in front and rear directions. The rear casing is provided with a guide mounting structure for disposing an optical cable inside the rear casing. The front casing is provided with a plug body at a front end thereof, and a limiting structure is arranged between the front casing and the rear casing to limit positions to which the front casing and the rear casing are separated in the front and rear directions.

A spring is pressed and disposed between the rear casing and the front casing and/or between the rear casing and the plug body. Elastic supporting between the rear casing and the front casing is thereby achieved.

The guide mounting structure is a guide mounting hole disposed on the rear casing. The guide mounting structure may thereby protect a cable.

The rear casing is oriented and inserted in the front casing, and the limiting structure includes an inner flange disposed on an inner side wall of the front casing. The limiting structure further includes an outer protrusion disposed on an outer circumferential surface of the rear casing and stopping and fitting with the inner flange from front to rear. The rear casing and the front casing are thus prevented from being separated from each other when the two are oriented and assembled.

The front casing is formed by an upper portion and a lower portion engaged with each other, or is surroundingly formed by an integral structure. The spring, the plug body, and the rear casing may thereby be conveniently assembled.

The front casing includes a supporting base at a lower side and a cover plate at an upper side, and a guide mounting groove for installing the spring is disposed on the supporting base. A simple structure is thereby provided, and assembly may be performed conveniently.

An oriented fitting surface between the rear casing and the front casing is a circular arc-shaped surface, and the rear casing is rotatably assembled in the front casing. When the rear casing rotates relative to the front casing, an optical cable may circumferentially rotate to a small extent when a plug and a receptacle are locked in a process in which the plug is plugged into the receptacle, so that the plug connector is installed as required.

An avoiding surface configured to avoid the cover plate is disposed on the rear casing, and a gap is provided between a lower plate surface of the cover plate and the avoiding surface. When the rear casing circumferentially rotates relatively to the front casing, a rotating range of the rear casing is ensured to be limited through the lower plate surface of the cover plate, so that the optical core is prevented from being excessively twisted and thus the internal optical path is prevented from being damaged.

An unlocking elastic piece configured to press a locking elastic piece of the plug body downward is disposed on the cover plate for unlocking the plug body. Unlocking is conveniently performed, and a simple structure is provided.

A number of the plug body is two or greater, and a connection channel configured to allow optical cores of the plug bodies to pass through together is formed inside the spring. Favorable overall stability is delivered, and a compact structure is provided.

The plug body is an LC plug, an SC plug, an MTP plug, or an optical plug-in module. The plug body may thereby be widely applied.

The front casing and the rear casing are assembled in non-rotatable manner. Torsion resistance is ensured to be provided to protect a cable.

A key extending front and rear is disposed on the front casing, and a key groove fitting the key is disposed on the rear casing. The front casing and the rear casing are assembled in non-rotatable manner through orientation and fitting of the key and the key groove. A simple structure is thereby provided, and processing and assembly may be performed conveniently.

The following technical features are adopted for the plug connector of the invention.

The plug connector includes a core unit and a protective casing disposed outside and shielding the core unit, and a front end of the core unit is an inserted end. The core unit includes a front casing and a rear casing oriented and assembled in front and rear directions. The rear casing is provided with a guide mounting structure for disposing an optical cable inside the rear casing. The rear casing faces backward to stop the protective casing, the front casing is provided with a plug body at a front end thereof, and a limiting structure is arranged between the front casing and the rear casing to limit positions to which the front casing and the rear casing are separated in the front and rear directions.

A spring is pressed and disposed between the rear casing and the front casing and/or between the rear casing and the plug body. Elastic supporting between the rear casing and the front casing is thereby achieved.

The guide mounting structure is a guide mounting hole disposed on the rear casing. The guide mounting structure may thereby protect a cable.

The rear casing is oriented and inserted in the front casing, and the limiting structure includes an inner flange disposed on an inner side wall of the front casing. The limiting structure further includes an outer protrusion disposed on an outer circumferential surface of the rear casing and stopping and fitting with the inner flange from front to rear. The rear casing and the front casing are thus prevented from being separated from each other when the two are oriented and assembled.

The front casing is formed by an upper portion and a lower portion engaged with each other, or is surroundingly formed by an integral structure. The spring, the plug body, and the rear casing may thereby be conveniently assembled.

The front casing includes a supporting base at a lower side and a cover plate at an upper side, and a guide mounting groove for installing the spring is disposed on the supporting base. A simple structure is thereby provided, and assembly may be performed conveniently.

An oriented fitting surface between the rear casing and the front casing is a circular arc-shaped surface, and the rear casing is rotatably assembled in the front casing. When the rear casing rotates relative to the front casing, an optical cable may circumferentially rotate to a small extent when a plug and a receptacle are locked in a process in which the plug is plugged into the receptacle, so that the plug connector is installed as required.

An avoiding surface configured to avoid the cover plate is disposed on the rear casing, and a gap is provided between a lower plate surface of the cover plate and the avoiding surface. When the rear casing circumferentially rotates relatively to the front casing, a rotating range of the rear casing is ensured to be limited through the lower plate surface of the cover plate, so that the optical core is prevented from being excessively twisted and thus the internal optical path is prevented from being damaged.

An unlocking elastic piece configured to press a locking elastic piece of the plug body downward is disposed on the cover plate for unlocking the plug body. Unlocking is conveniently performed, and a simple structure is provided.

A number of the plug body is two or greater, and a connection channel configured to allow optical cores of the plug bodies to pass through together is formed inside the spring. Favorable overall stability is delivered, and a compact structure is provided.

The plug body is an LC plug, an SC plug, an MTP plug, or an optical plug-in module. The plug body may thereby be widely applied.

The front casing and the rear casing are assembled in standstill. Torsion resistance is ensured to be provided to protect a cable.

A key extending front and rear is disposed on the front casing, and a key groove fitting the key is disposed on the rear casing. The front casing and the rear casing are assembled in non-rotatable manner through orientation and fitting of the key and the key groove. A simple structure is thereby provided, and processing and assembly may be performed conveniently.

The following technical features are adopted for the connector assembly of the invention.

The connector assembly includes a plug connector and a receptacle connector, and the plug connector includes a core unit and a protective casing disposed outside and shielding the core unit. A front end of the core unit is an inserted end. The core unit includes a front casing and a rear casing oriented and assembled in front and rear directions. The rear casing is provided with a guide mounting structure for disposing an optical cable inside the rear casing. The rear casing faces backward to stop the protective casing, the front casing is provided with a plug body at a front end thereof, and a limiting structure is arranged between the front casing and the rear casing to limit positions to which the front casing and the rear casing can be separated in the front and rear directions.

A spring is pressed and disposed between the rear casing and the front casing and/or between the rear casing and the plug body. Elastic supporting between the rear casing and the front casing is thereby achieved.

The guide mounting structure is a guide mounting hole disposed on the rear casing. The guide mounting structure may thereby protect a cable.

The rear casing is oriented and inserted in the front casing, and the limiting structure includes an inner flange disposed on an inner side wall of the front casing. The limiting structure further includes an outer protrusion disposed on an outer circumferential surface of the rear casing and stopping and fitting with the inner flange from front to rear. The rear casing and the front casing are thus prevented from being separated from each other when the two are oriented and assembled.

The front casing is formed by an upper portion and a lower portion engaged with each other, or is surroundingly formed by an integral structure. The spring, the plug body, and the rear casing may thereby be conveniently assembled.

The front casing includes a supporting base at a lower side and a cover plate at an upper side, and a guide mounting groove for installing the spring is disposed on the supporting base. A simple structure is thereby provided, and assembly may be performed conveniently.

An oriented fitting surface between the rear casing and the front casing is a circular arc-shaped surface, and the rear casing is rotatably assembled in the front casing. When the rear casing rotates relative to the front casing, an optical cable may circumferentially rotate to a small extent when a plug and a receptacle are locked in a process in which the plug is plugged into the receptacle, so that the plug connector is installed as required.

An avoiding surface configured to avoid the cover plate is disposed on the rear casing, and a gap is provided between a lower plate surface of the cover plate and the avoiding surface. When the rear casing circumferentially rotates relatively to the front casing, a rotating range of the rear casing is ensured to be limited through the lower plate surface of the cover plate, so that the optical core is prevented from being excessively twisted and thus the internal optical path is prevented from being damaged.

An unlocking elastic piece configured to press a locking elastic piece of the plug body downward is disposed on the cover plate for unlocking the plug body is implemented. Unlocking is conveniently performed, and a simple structure is provided.

A number of the plug body is two or greater, and a connection channel configured to allow optical cores of the plug bodies to pass through together is formed inside the spring. Favorable overall stability is delivered, and a compact structure is provided.

The plug body is an LC plug, an SC plug, an MTP plug, or an optical plug-in module. The plug body may thereby be widely applied.

The front casing and the rear are assembled in standstill. Torsion resistance is ensured to be provided to protect a cable.

A key extending front and rear is disposed on the front casing, and a key groove fitting the key is disposed on the rear casing. The front casing and the rear casing are assembled in non-rotatable manner through orientation and fitting of the key and the key groove. A simple structure is thereby provided, and processing and assembly may be performed conveniently.

Compared to the related art, favorable effects provided by the invention include that the rear casing may slide from front to rear relative to the front casing as the rear casing and the front casing are oriented and assembled in the plug connector provided by the invention. After the plug body is plugged in place, a protective casing and a receptacle casing are locked and fit to each other continuously, such that the rear casing is ensured to have a certain freedom to move in a forward direction when being pushed by the protective casing, thereby satisfying the need of different mounting tolerances in the receptacle casing, simplifying the structure and preventing the plug body from damage caused by an excessive pressing force.

DESCRIPTION OF THE EMBODIMENTS

Figure 1:
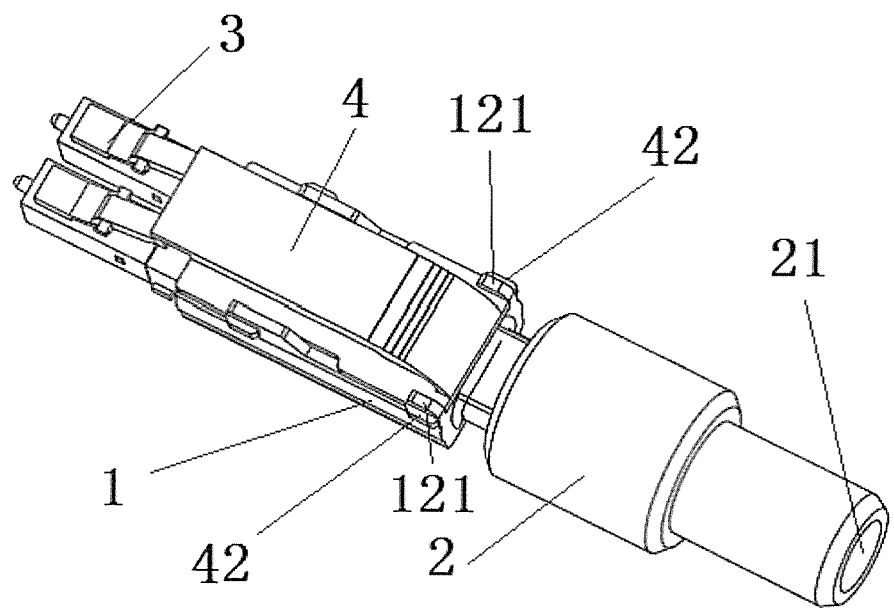
FIG. 1 is a schematic view of a structure of a core unit according to a first embodiment of the invention.
Figure 2:
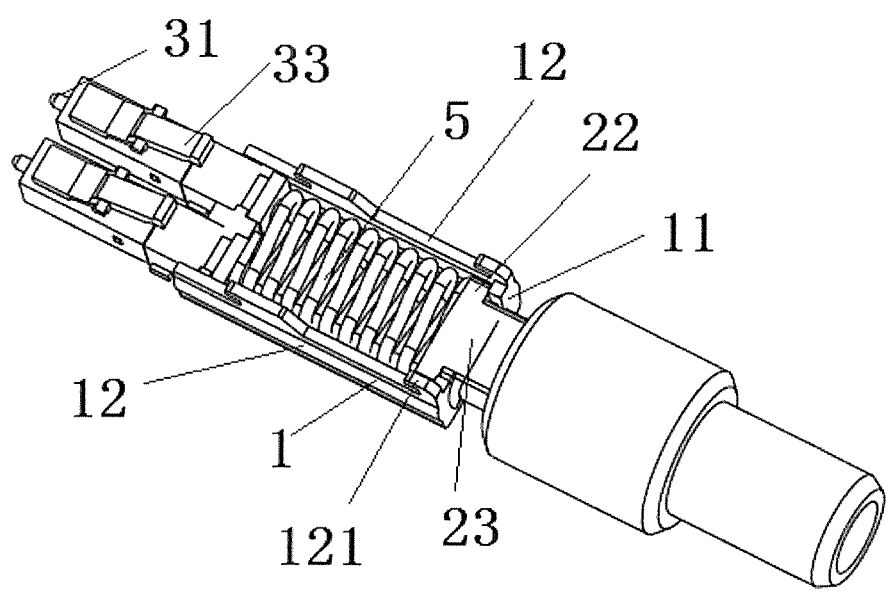
FIG. 2 is a schematic view of the structure of the core unit of FIG. 1 without a cover plate.
Figure 3:
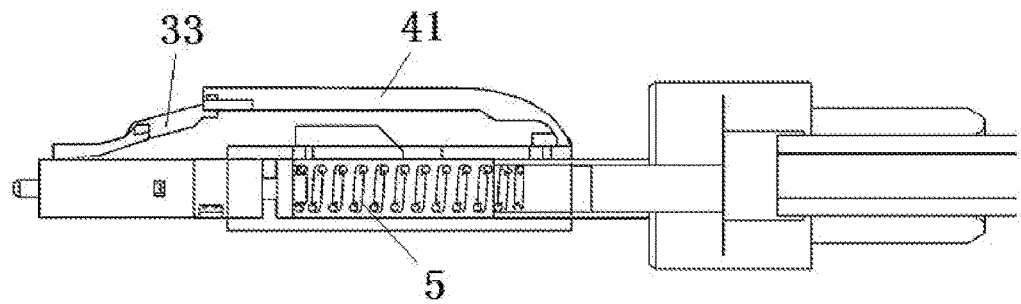
FIG. 3 is a vertical cross-sectional view in an extending direction of the core unit in FIG. 2.
Figure 4:
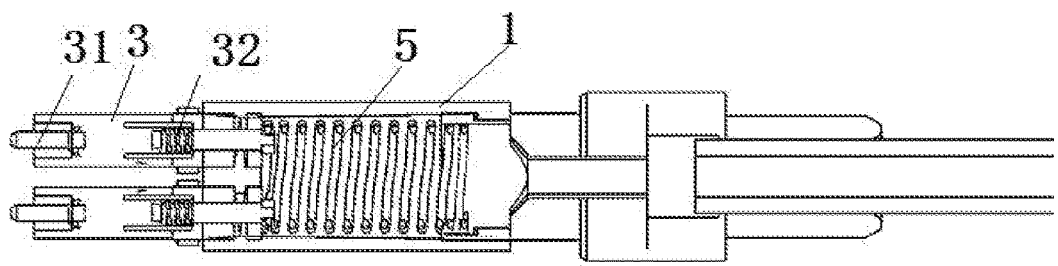
FIG. 4 is a horizontal cross-sectional view in the extending direction of the core unit in FIG. 2.

Embodiments of the invention are provided in accompany with drawings to provide a further description of the invention.

In a core unit provided by a first embodiment of the invention, as shown in FIGS. 1 to 4, the core unit includes a front casing and a rear casing 2 oriented and assembled in front and rear directions. The front casing is provided with two LC type plug bodies 3 at a front end thereof, and the rear casing 2 is provided with a guide mounting hole 21 for disposing an optical cable inside the rear casing 2. Certainly, in other embodiments, the rear casing may also be provided with a guide mounting groove, instead of the guide mounting hole, for disposing a cable thereto. In each of the plug bodies 3, a contact member 31 is fixed inside the plug body 3. After the optical cable is fixed inside the guide mounting hole 21, an optical core inside the optical cable extends forward into an outer casing of the plug body 3 and is connected to the contact member 31 to turn on an optical path. A contact member spring 32 is pressed and disposed between the contact member 31 and the outer casing in the plug body 3. When a plug is plugged into a receptacle, the contact member spring 32 functions to allow the contact member 31 of the plug body 3 and a fitting contact member on the receptacle to stably butt against each other and to prevent the two from being in contact with each other unstably or from not butting against each other.

A plug spring 5 is pressed and disposed between the plug body 3 and the rear casing 2. The plug spring 5 is connected into the front casing, and a front end of the plug spring 5 is pressed by a rear end of the plug body 3. A spring receiving hole extending forward and backward is disposed at a front end of the rear casing 2. A rear end of the plug spring 5 extends into the spring receiving hole, so that the rear casing 2 and the plug body 3 may relatively move and may be assembled together in the front and rear directions. A limiting structure is arranged between the front casing and the rear casing 2 to limit positions to which the front casing and the rear casing 2 can be separated in the front and rear directions. In this embodiment, the rear casing 2 is oriented and inserted in the front casing. The limiting structure includes an inner flange 11 disposed at a rear end of the front casing and further includes an outer protrusion 22 disposed on an outer circumferential surface of the rear casing 2 and stopping and fitting with the inner flange 11 from front to rear. In this way, when being pressed by the plug spring 5, the rear casing 2 is ensured to be kept at a rear side of the front casing and is ensured not to be backward separated from the front casing.

The front casing includes a supporting base 1. The supporting base 1 is U-shaped, and a U-shaped groove of the supporting base 1 extends in the front and rear directions to form the guide mounting groove for installing the spring. Further, the rear casing 2 is inserted into a rear side in the U-shaped groove, and the plug body 3 is fixed to a front side in the U-shaped groove. A cover plate 4 is buckled with an upper end of the U-shaped groove. To be specific, horizontally-extending engaging grooves 121 of the same direction are disposed on two left and right supporting arms 12 of the supporting base 1. Correspondingly, protruding edges 42 engaged with the engaging grooves 121 internally are disposed at two left and right sides of the cover plate 4. As the protruding edges 42 are engaged and fitted with the engaging grooves 121, the cover plate 4 is buckled onto an upper end of the supporting base 1, and that the plug floating spring 5 is enclosed within.

The rear casing 2 is oriented and fitting as the outer protrusion 22 relatively slides along an inner side wall of the supporting base 1. Moreover, an oriented contact surface between the front casing and the rear casing 2 is a circular arc surface. In this way, when the rear casing 2 rotates relative to the front casing, the optical cable is circumferentially rotatable to a small extent when a plug connector and a receptacle connector are locked to each other in a process in which the plug connector is plugged into the receptacle connector, so that the plug connector is installed as required. Moreover, a circumferential surface of the front end of the rear casing 2 has an avoiding surface 23 configured to avoid an installation position of the cover plate 4. A certain gap is provided between the avoiding surface 23 and a lower plate surface of the cover plate 4. In this way, when the rear casing 2 rotates relatively to the front casing, a circumferential rotating range of the rear casing 2 is ensured to be limited through the lower plate surface of the cover plate 4, so that the optical core is prevented from being excessively twisted and thus the internal optical path is prevented from being damaged.

Further, in order to ensure that the cable may exhibit torsion resistance when the core unit is connected to the corresponding receptacle, in this embodiment, the front casing and the rear casing fit to each other in standstill relatively. That is, as a key groove is disposed on an inner side wall of a bottom portion of the front casing and a key is disposed on an outer side wall of a bottom portion of the rear casing, when the key is inserted into and fits with the key groove, the front casing and the rear casing may relatively fit in standstill. Certainly, in other embodiments, a polygonal structure may also be used, so an internal size of the front casing may be designed to be matched with an outer size of the rear casing, and that the two may fit in standstill.

A locking elastic piece 33 configured to lock the plug body 3 inside a receptacle hole of the receptacle may be disposed on an upper surface of the outer casing of the plug body 3, and a rear end of the locking elastic piece 33 is a free end which tilts up. An unlocking elastic piece 41 is correspondingly disposed on an upper plate surface of the cover plate 4, and a front end of the unlocking elastic piece 41 is a free end which tilts up. Moreover, the free end of the unlocking elastic piece 41 extends above the free end of the locking elastic piece 33. When unlocking is performed, the unlocking elastic piece 41 is pressed down, so the locking elastic piece 33 is pressed and is bent downward, and the plug body 3 is thereby unlocked.

An enclosed middle chamber of the plug spring 5 may allow the optical core of each of the plug bodies 3 to pass therethrough. That is, the front end of the plug spring 5 simultaneously presses both the rear ends of the two plug bodies 3, and the optical core at the rear sides of the plug bodies 3 is enclosed within the middle chamber of the plug spring 5, so that the rear casing 2 is ensured to be stably oriented and rotates.

Figure 5:
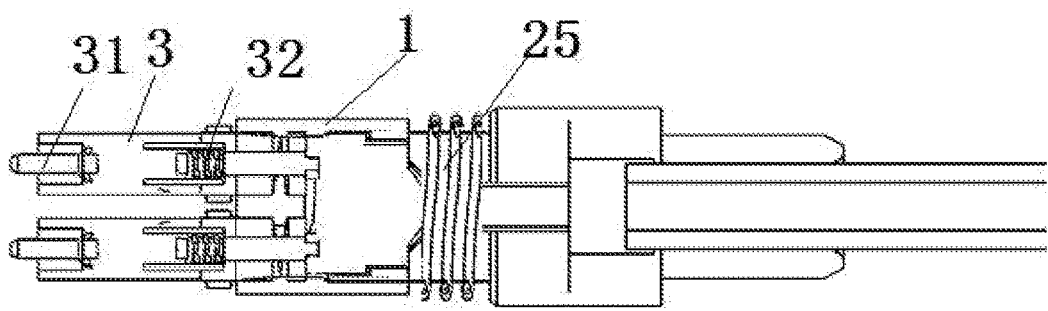
FIG. 5 is a schematic view of a structure of a core unit according to a second embodiment of the invention.

In the invention, a difference between a plug provided by a second embodiment and the plug provided by the first embodiment is that a spring 25 may be pressed and disposed between the front casing and the rear casing 2, as shown in FIG. 5, and that the rear casing 2 may be rotatably installed.

Figure 6:
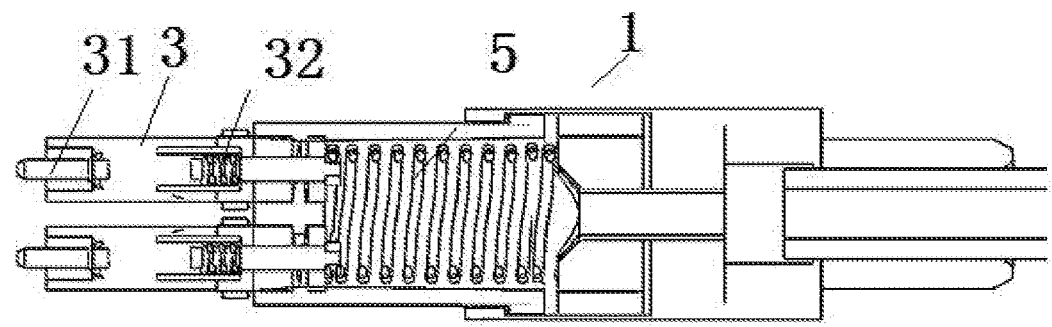
FIG. 6 is a schematic view of a structure of a core unit according to a third embodiment of the invention.

In the invention, a difference between a plug provided by a third embodiment and the plug provided by the first embodiment is that: as shown in FIG. 6, the front casing may be inserted into the rear casing 2 so that the two may be oppositely oriented, and the limiting structure is provided through the inner flange disposed on the inner side wall of the rear casing 2 and the outer protrusion disposed on an outer circumference of the front casing.

In other embodiments, the front casing may be formed as an enclosed integral structure, and an elastic barb structure relative to the inner flange may be disposed on a circumferential surface of the rear casing, so that the rear casing may be forcibly installed into the front casing. The plug body may be an SC plug, an MTP plug, and other plug structures which can be applied into the plug connector, or an optical plug-in module. The number of the plug body may be one, and the number may be correspondingly increased according to actual needs. The plug spring may not have to be sleeved on the optical core and may be directly disposed outside the optical core. In other embodiments, the spring may not have to be disposed between the front casing and the rear casing. The front casing and the rear casing may be directly oriented and assembled, and a certain space may also be provided to the rear casing relative to the front casing.

A plug connector provided by the invention includes a core unit and a protective casing disposed outside and shielding the core unit. A structural form of such core unit is identical to that of the abovementioned core unit, so detailed description is not provided herein.

A connector assembly provided by the invention includes a plug connector and a receptacle connector, and the plug connector includes a core unit and a protective casing disposed outside and shielding the core unit. A structural form of such core unit is identical to that of the abovementioned core unit, so detailed description is not provided herein.

What is claimed is:

1. A core unit, a front end of the core unit being an inserted end, the core unit comprising a front casing and a rear casing oriented and assembled in front and rear directions, wherein the rear casing is provided with a guide mounting structure for disposing an optical cable inside the rear casing, the front casing is provided with a plug body at a front end thereof, and a limiting structure is arranged between the front casing and the rear casing to limit positions to which the front casing and the rear casing are separated in the front and rear directions, wherein a spring is pressed and disposed between the rear casing and the plug body, wherein the rear casing is oriented and inserted in the front casing, and the limiting structure comprises an inner flange disposed on an inner side wall of the front casing and further comprises an outer protrusion disposed on an outer circumferential surface of the rear casing and stopping and fitting with the inner flange from front to rear, wherein the front casing comprises a supporting base at a lower side and a cover plate at an upper side, and a guide mounting groove for installing the spring is disposed on the supporting base, wherein the cover plate is buckled onto an upper end of the supporting base so as to fixed two left and right supporting arms of the supporting base at a rear end of the front case.

2. The core unit as claimed in claim 1, wherein an oriented fitting surface between the rear casing and the front casing is a circular arc-shaped surface, and the rear casing is rotatably assembled in the front casing, an avoiding surface configured to avoid the cover plate is disposed on the rear casing, and a gap is provided between a lower plate surface of the cover plate and the avoiding surface.

3. The core unit as claimed in claim 2, wherein a number of the plug body is two or greater, and a connection channel configured to allow optical cores of the plug bodies to pass through together is formed inside the spring.

4. The core unit as claimed in claim 1, wherein the front casing and the rear casing are assembled in non-rotatable manner.

5. A plug connector, comprising a core unit and a protective casing disposed outside and shielding the core unit, wherein a front end of the core unit—is an inserted end, the core unit comprises a front casing and a rear casing oriented and assembled in front and rear directions, the rear casing is provided with a guide mounting structure for disposing an optical cable inside the rear casing, the rear casing faces backward to stop the protective casing, the front casing is provided with a plug body at a front end thereof, and a limiting structure is arranged between the front casing and the rear casing to limit positions to which the front casing and the rear casing are separated in the front and rear directions, wherein a spring is pressed and disposed between the rear casing and the plug body, wherein the rear casing is oriented and inserted in the front casing, and the limiting structure comprises an inner flange disposed on an inner side wall of the front casing and further comprises an outer protrusion disposed on an outer circumferential surface of the rear casing and stopping and fitting with the inner flange from front to rear, wherein the front casing comprises a supporting base at a lower side and a cover plate at an upper side, and a guide mounting groove for installing the spring is disposed on the supporting base, wherein the cover plate is buckled onto an upper end of the supporting base so as to fixed two left and right supporting arms of the supporting base at a rear end of the front case.

6. The plug connector as claimed in claim 5, wherein an oriented fitting surface between the rear casing and the front casing is a circular arc-shaped surface, and the rear casing is rotatably assembled in the front casing, an avoiding surface configured to avoid the cover plate is disposed on the rear casing, and a gap is provided between a lower plate surface of the cover plate and the avoiding surface.

7. The plug connector as claimed in claim 6, wherein a number of the plug body is two or greater, and a connection channel configured to allow optical cores of the plug bodies to pass through together is formed inside the spring.

8. The plug connector as claimed in claim 5, wherein the front casing and the rear casing are assembled in non-rotatable manner.

9. A connector assembly, comprising a plug connector and a receptacle connector, wherein the plug connector includes a core unit and a protective casing disposed outside and shielding the core unit, a front end of the core unit is an inserted end, the core unit comprises a front casing and a rear casing oriented and assembled in front and rear directions, the rear casing is provided with a guide mounting structure for disposing an optical cable thereto, the rear casing faces backward to stop the protective casing, the front casing is provided with a plug body at a front end thereof, and a limiting structure is arranged between the front casing and the rear casing to limit positions to which the front casing and the rear casing are separated in the front and rear directions, wherein a spring is pressed and disposed-between the rear casing and the plug body, and a connection channel configured to allow optical cores of the plug bodies to pass through together is formed inside the spring, wherein the rear casing is oriented and inserted in the front casing, and the limiting structure comprises an inner flange disposed on an inner side wall of the front casing and further comprises an outer protrusion disposed on an outer circumferential surface of the rear casing and stopping and fitting with the inner flange from front to rear, wherein the front casing is formed by a supporting base at a lower side and a cover plate at an upper side that are engaged with each other, wherein the cover plate is buckled onto an upper end of the supporting base so as to fixed two left and right supporting arms of the supporting base at a rear end of the front case.

* * * * *